United States Patent
Ghandriz et al.

(10) Patent No.: US 12,162,494 B2
(45) Date of Patent: Dec. 10, 2024

(54) METHODS FOR REDUCING HIGH-SPEED OFF-TRACKING IN MULTI-TRAILER HEAVY DUTY VEHICLES

(71) Applicant: VOLVO TRUCK CORPORATION, Gothenburg (SE)

(72) Inventors: Toheed Ghandriz, Mölndal (SE); Peter Nilsson, Hovås (SE); Bengt Jacobson, Mölnlycke (SE); Leo Laine, Härryda Västra Götaland (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 18/253,360

(22) PCT Filed: Nov. 19, 2020

(86) PCT No.: PCT/EP2020/082708
§ 371 (c)(1),
(2) Date: May 17, 2023

(87) PCT Pub. No.: WO2022/106005
PCT Pub. Date: May 27, 2022

(65) Prior Publication Data
US 2023/0415746 A1 Dec. 28, 2023

(51) Int. Cl.
*B60W 30/18* (2012.01)
*B62D 59/04* (2006.01)

(52) U.S. Cl.
CPC ....... *B60W 30/18172* (2013.01); *B62D 59/04* (2013.01); *B60W 2300/125* (2013.01);
(Continued)

(58) Field of Classification Search
CPC ............ B62D 59/04; B60W 30/18172; B60W 2300/125; B60W 2300/14; B60W 2300/145; B60W 2300/147; B60W 2520/105; B60W 2552/30; B60W 2552/40; B60W 2050/0013; B60W 2050/0026;
(Continued)

(56) References Cited

U.S. PATENT DOCUMENTS 10,518,831 B2   12/2019   Wright
2013/0190989 A1   7/2013   Hahne
(Continued)

OTHER PUBLICATIONS

International Search Report and Written Opinion in corresponding International Application No. PCT/EP2020/082708 mailed Jul. 30, 2021 (13 pages).
Ghandriz Toheed et al: "Computationally 1-16 Efficient Nonlinear One- and Two-Track Medels for Multitrailer Road Vehicles", IEEE Access, IEEE, USA, vol. 8, Nov. 7, 2020 (Nov. 7, 2020), pp. 203854-203875, XP011820780.
(Continued)

*Primary Examiner* — Tisha D Lewis
(74) *Attorney, Agent, or Firm* — Venable LLP; Jeffri A. Kaminski

(57) ABSTRACT

A method for reducing off-tracking by a multi-trailer heavy duty vehicle during a maneuver is disclosed. The method obtains a model of vehicle dynamics describing dynamics of the multi-trailer heavy duty vehicle, determines respective force trajectories for two or more axles of the vehicle as a solution to a NOCP. The NOCP is formulated with an objective to at least minimize trailer off-tracking, and based on the model of vehicle dynamics. The motion of the heavy duty vehicle is controlled during the maneuver based on the determined force trajectories.

16 Claims, 9 Drawing Sheets

(52) U.S. Cl.
    CPC ... *B60W 2300/14* (2013.01); *B60W 2300/145* (2013.01); *B60W 2300/147* (2024.01); *B60W 2520/105* (2013.01); *B60W 2552/30* (2020.02); *B60W 2552/40* (2020.02)

(58) Field of Classification Search
    CPC ..... B60W 2050/0033; B60W 2720/26; B60W 2720/30; B60W 50/06
    See application file for complete search history.

(56) References Cited

U.S. PATENT DOCUMENTS

| | | | |
|---|---|---|---|
| 2013/0191000 A1 | 7/2013 | Hahne | |
| 2017/0320488 A1 | 11/2017 | Alm et al. | |
| 2018/0134300 A1 | 5/2018 | Anschuber et al. | |
| 2019/0265714 A1* | 8/2019 | Ball | G05D 1/0217 |
| 2021/0373513 A1* | 12/2021 | Quirynen | G06F 17/13 |
| 2024/0001928 A1* | 1/2024 | Ghandriz | B62D 53/0864 |

OTHER PUBLICATIONS

Tomas Szabo et al: "Model-predictive control of powershifts of heavy-duty trucks with dual-clutch transmissions", Decision and Control (CDC), 2012 IEEE 51st Annual Conference on, IEEE, Dec. 10, 2012 (Dec. 10, 2012), pp. 4555-4561, XP032324252.

Claudio Altafini: "Path Following With Reduced Off-Tracking for Multibody Wheeled Vehicles", IEEE Transactions on Control Systems Technology, IEEE Service Center, New York, NY. US. vol. 11, No. 4, Jul. 1, 2003 (Jul. 1, 2003), XP011071794.

Ljungqvist Oskar et al: "On sensing-aware model predictive path-following control for a reversing general 2-trailer with a car-like tractor", 2020 IEEE International Conference on Robotics and Automation (ICRA), IEEE, May 31, 2020 (May 31, 2020). pp. 8813-8819, XP033826685.

Ghandriz Toheed et al (2023): "Trajectory-Following and Off-Tracking Minimization of Long Combination Vehicles: A Comparison Between Nonlinear and Linear Model Predictive Control", Vehicle System Dynamics, DOI: 10.1080/00423114.2022.2164513.

* cited by examiner

METHODS FOR REDUCING HIGH-SPEED OFF-TRACKING IN MULTI-TRAILER HEAVY DUTY VEHICLES

CROSS-REFERENCE TO RELATED APPLICATIONS

This application is a U.S. National Stage application of PCT/EP2020/082708, filed Nov. 19, 2020 and published on May 27, 2022 as WO 2022/106005, all of which is hereby incorporated by reference in its entirety.

TECHNICAL FIELD

The present disclosure relates to heavy duty vehicles, and in particular to multi-trailer vehicles comprising one or more dolly vehicle units. Although the invention will be described mainly with respect to semi-trailer vehicles and trucks, the invention is not restricted to this particular type of vehicle but may also be used in other types of vehicles.

BACKGROUND

A semitrailer vehicle normally comprises a tractor arranged to tow a trailer unit via a fifth wheel connection. In order to extend the cargo transport ability of the semitrailer vehicle, a dolly vehicle unit can be added to the vehicle combination, which allows for additional trailer units to be towed by the same tractor. A traditional dolly is an unpowered vehicle unit designed for connection to a tractor unit, truck, or prime mover vehicle with strong traction power.

Dolly vehicles comprising on-board energy sources such as electric machines and dolly vehicles with one or more steered axles have recently been proposed. Such dolly vehicles can provide additional power to the vehicle combination, thus reducing the traction power requirements imposed on the prime mover vehicle. Electrified dolly vehicles may also reduce overall fuel consumption by the vehicle combination since they provide a degree of hybridization to conventional diesel-engine powered tractors. Steered axle dolly vehicles may furthermore be used for improved steering of the vehicle combination, e.g., when negotiating sharp curves.

A problem with multi-trailer vehicles is that trailer units may veer off track during abrupt turns such as in evasive manoeuvres. This effect is often referred to as off-tracking or trailer over-shooting and is normally most pronounced for the last trailer unit.

In the article "Trajectory-Following and Off-Tracking Minimization of Long Combination Vehicles: A Comparison Between Nonlinear and Linear Model Predictive Control", IEEE Access, 2020, T. Ghandriz, B. Jacobson, P. Nilsson, L. Laine, and N. Fröjd discuss issues related to control of multi-trailer vehicle combinations.

U.S. Pat. No. 10,518,831 B2 relates to self-powered steerable dolly vehicles. Methods for controlling the dolly vehicles in order to, e.g., negotiate sharp turns, are disclosed. Methods for controlling propulsion and regenerative braking operations in dependence of an upcoming vehicle route to be travelled by the dolly vehicle are also discussed.

However, there is a need for further development and optimization of heavy duty vehicle control in order to reduce trailer off-tracking during, e.g., evasive manoeuvres.

SUMMARY

It is an object of the present disclosure to provide methods, control units and vehicles which alleviate at least some of the above-mentioned issues.

This object is at least in part achieved by a method for reducing off-tracking by a multi-trailer heavy duty vehicle during a maneuver. The method comprises obtaining a model of vehicle dynamics describing dynamics of the multi-trailer heavy duty vehicle, determining respective force trajectories for two or more axles of the vehicle as a solution to a non-linear optimal control problem (NOCP), where the NOCP is formulated with an objective to at least minimize trailer off-tracking, and wherein the NOCP is formulated based on the model of vehicle dynamics and a prediction of vehicle control during the maneuver, and controlling motion of the heavy duty vehicle during the maneuver based on the determined force trajectories.

This method has been shown to be able to effectively reduce vehicle unit off-tracking during maneuvers such as abrupt lane changes and evasive maneuvers comprising hard turning control inputs, i.e., banking. The method may, e.g., be used to derive target tyre force trajectories and/or target wheel slip trajectories for at least two axles to be followed during the maneuver. Alternatively, the method may be used to derive target wheel torque trajectories or target axle torque trajectories to be followed during the maneuver.

According to aspects, the method comprises obtaining information related to a road friction coefficient associated with an upcoming vehicle path, wherein the NOCP is formulated to account for the road friction coefficient.

This means that the disclosed methods are able to adjust to and account for variations in road friction conditions, which is an advantage.

According to aspects, the method comprises configuring a limit $F_{max}$ on axle forces given by $$F_{max} = S\mu F_z$$

where S is a safety factor smaller than 1.0, and wherein the NOCP is constrained by the limit $F_{max}$ on axle forces.

This is a relatively straight forward constraint which can be implemented with reasonable complexity, which is an advantage.

According to aspects, the method comprises configuring lateral and longitudinal wheel slip limits $\lambda_{lim}$ for at least two wheels of an axle on the heavy duty vehicle, wherein lateral and longitudinal wheel slip values are related to respective lateral and longitudinal tyre force values $F_x$, $F_y$ via a pre-determined combined tyre slip model, wherein the NOCP is constrained by the lateral and longitudinal wheel slip limits $\lambda_{lim}$.

This way it can be ensured that the vehicle maneuver will not result in excessive wheel slip. Excessive wheel slip is undesirable since it may present a safety hazard and also complicates vehicle control since non-linear effects may dominate vehicle behavior in the high wheel slip domain.

According to aspects, the method comprises solving the NOCP in real-time. This option may be suitable for vehicles comprising relatively powerful on-board data processing systems. However, according to other aspects, the method comprises obtaining a solution to the NOCP from a predetermined look-up table (LUT) wherein the LUT comprises solutions to a plurality of NOCPs solved for different NOCP input parameters, where a solution is selected from the LUT in dependence of a respective set of parameters of a current operating scenario of the heavy duty vehicle and in dependence of the maneuver. This way a pre-computed set of solutions can be used to control the vehicle without requiring any significant on-board data processing capability, which is an advantage. The method may, e.g., comprise obtaining the solution to the NOCP by obtaining target brake and propulsion force trajectories from the LUT based on a steering angle of the vehicle and based on a speed of the vehicle.

According to aspects, the force trajectories for the two or more axles of the vehicle (100) have equal tyre forces for each side of the respective axle. This simplifies vehicle control since only axle forces need to be considered instead of individual wheel forces.

There is also disclosed herein control units and vehicles associated with the above discussed advantages.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. Further features of, and advantages with, the present invention will become apparent when studying the appended claims and the following description. The skilled person realizes that different features of the present invention may be combined to create embodiments other than those described in the following, without departing from the scope of the present invention.

BRIEF DESCRIPTION OF THE DRAWINGS

With reference to the appended drawings, below follows a more detailed description of embodiments of the invention cited as examples. In the drawings.

DETAILED DESCRIPTION OF EXAMPLE EMBODIMENTS OF THE INVENTION

Figure 1:
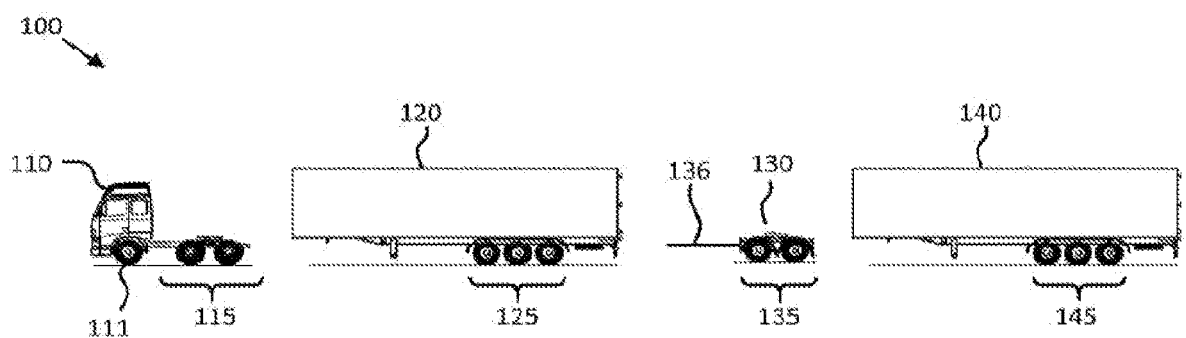
FIG. 1 shows an example multi-trailer vehicle combination.

The invention will now be described more fully hereinafter with reference to the accompanying drawings, in which certain aspects of the invention are shown. This invention may, however, be embodied in many different forms and should not be construed as limited to the embodiments and aspects set forth herein; rather, these embodiments are provided by way of example so that this disclosure will be thorough and complete, and will fully convey the scope of the invention to those skilled in the art. Like numbers refer to like elements throughout the description.

It is to be understood that the present invention is not limited to the embodiments described herein and illustrated in the drawings; rather, the skilled person will recognize that many changes and modifications may be made within the scope of the appended claims.

FIG. 1 illustrates an example vehicle combination 100 for cargo transport. The vehicle combination 100 comprises a truck or towing vehicle 110 configured to tow a first trailer unit 120 in a known manner, e.g., by a fifth wheel connection. To extend the cargo transport capability of the vehicle combination 100, a dolly vehicle 130 can be connected to the rear of the first trailer 120 via a drawbar 136. This dolly vehicle can then tow a second trailer 140, thus increasing the cargo transport capacity of the vehicle combination. Consequently, the heavy duty vehicle 100 is a multi-trailer vehicle.

Herein, a heavy duty vehicle is taken to be a vehicle designed for the handling and transport of heavier objects or large quantities of cargo. As an example, a heavy duty vehicle could be a semi-trailer vehicle or a truck. As another example, a heavy duty vehicle could be a vehicle designed for use in construction or farming.

A dolly vehicle 130 is traditionally a passive vehicle comprising no driven or steerable axles, and with a relatively short wheelbase. It has recently been shown that self-powered dolly vehicles may provide both increased fuel efficiency and maneuverability. This type of self-powered dolly vehicle comprises an on-board energy source, such as a battery, super-capacitor, or a fuel cell stack, and at least one pair of driven wheels. Some self-powered dolly vehicles may also be steerable. An example of self-powered steerable axles of this type suitable for use with a self-powered dolly vehicle will be discussed in more detail below in connection to, e.g., FIG. 2A. This type of driven axle can of course also be used with prime movers 110 and trailer units 120, 140.

Increased fuel efficiency is for instance obtained if an electric machine arranged for regenerative braking is installed in the dolly vehicle or self-powered trailer unit. The vehicle combination then effectively becomes a hybrid electric vehicle, even if the towing vehicle only comprises a traditional diesel engine with no on-board electric hybridization.

Adding a self-powered dolly vehicle 130 to the vehicle combination 100 can also improve startability, since the dolly vehicle is then able to generate extra torque when bringing the vehicle combination into motion from a standstill. Vehicle startability may be a limiting factor in the maximum load possible to carry, and a self-powered dolly vehicle may therefore contribute to an increased cargo capacity, which is an advantage.

Both the truck 110 and the self-powered steerable dolly vehicle 130 may comprise electric machines for propulsion and/or regenerative brakes for decelerating the vehicle unit while harvesting energy. The self-powered vehicle units also comprise respective energy sources. An energy source is normally a battery, super-capacitor, fuel cell or other device arranged to store electrical energy. However, an energy source may also comprise mechanical energy storage devices such as springs and compressed air tanks for pneumatic machines. Combinations of different types of energy sources can also be used. A traditional fuel tank for storing gasoline or diesel fuel can of course also be considered an energy source in this context. The present disclosure, however, focuses on propulsion arrangements based on electric machines powered by an electrical energy storage device, such as a battery or a fuel cell stack.

It is appreciated that the present disclosure is applicable to multi-trailer vehicle combinations comprising passive dolly vehicle units as well as self-powered dolly vehicle units.

Figure 2A:
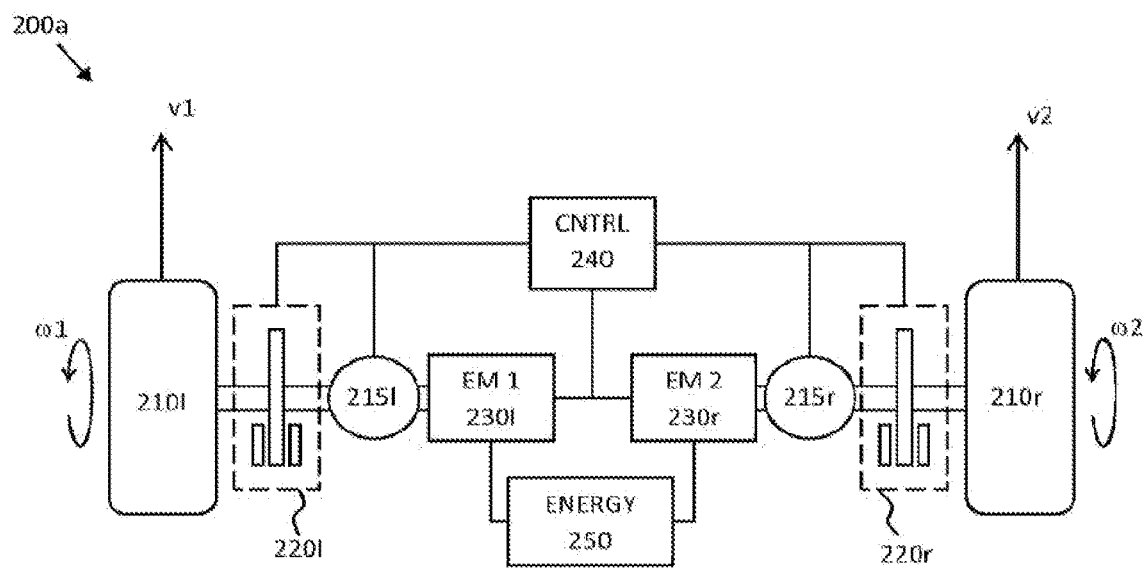
FIG. 2A illustrates an example driven axle of a heavy duty vehicle.

FIG. 2A schematically illustrates an example driven axle arrangement 200a which can be used with, e.g., the self-powered dolly vehicle unit 130 or with the prime mover 110. The driven axle arrangement comprises an axle with left- and right-hand side driven wheels 210*l*, 210*r*. The axle is powered by a propulsion arrangement. The example 200a shown in FIG. 2A comprises a propulsion arrangement comprising an energy source 250 such as a battery connected to two electrical machines 230*l*, 230*r* which each drive one of the left and right wheels 210*l*, 210*r*. A driven axle arrangement comprising a propulsion arrangement such as an electric machine or combustion engine which in turn powers the left and right wheels 210*l*, 210*r* via a differential is of course also possible.

Furthermore, the driven axle arrangement in FIG. 2A comprises friction brakes 220*l*, 220*r* and an active suspension arrangement 215*l*, 215*r*. Both the friction brakes 220*l*, 220*r*, the suspension 215*l*, 215*r* and the electrical machines 230*l*, 230*r* may be controlled by a control unit 240.

Figure 2B:
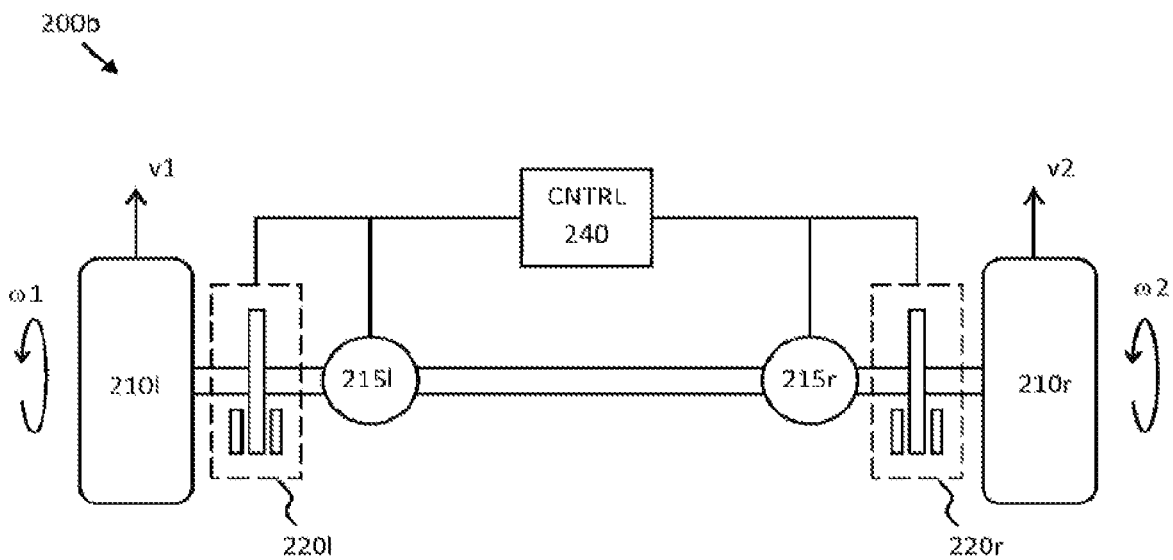
FIG. 2B illustrates an example non-driven axle of a heavy duty vehicle.

FIG. 2B schematically illustrates an example non-driven axle arrangement 200b of a heavy duty vehicle. The non-driven axle arrangement 200b comprises a control unit 240 arranged to control an active suspension 215*l*, 215*r* as well as friction brakes 220*l*, 220*r* with which braking is applied to the wheels 210*l*, 210*r*.

Both the towing vehicle 110 and the steerable dolly vehicle 130 (as well as trailer units 120, 140, 160) may comprise control units, which will be discussed in more detail below in connection to FIG. 8. These control units can be arranged according to a layered functional architecture where some functions may be comprised in a traffic situation management (TSM) layer and some other functions may be comprised in a vehicle motion management (VMM) layer.

Generally, the TSM layer plans vehicle operation with a time horizon of, e.g., 10-30 seconds. This time frame for instance corresponds to the time it takes for the vehicle to negotiate a curve, i.e., to transition from driving straight to entering the curve and then exiting the curve again or driving up a hill. The TSM layer may continuously request desired acceleration profiles ($a_{req}$) and curvature profiles ($c_{req}$) from the VMM layer. The VMM layer operates with a time horizon of about 1 second or so, and continuously transforms the acceleration profiles and curvature profiles into control commands, sometimes referred to as requests, for the various motion support device (MSD) functions on the vehicle, i.e., it among other things performs MSD coordination.

It is an objective of the present disclosure to provide control methods which can be executed by the TSM and/or by the VMM function which reduces trailer off-tracking during turning maneuvers such as evasive maneuvering, abrupt lane changes, and the like.

Figure 3:
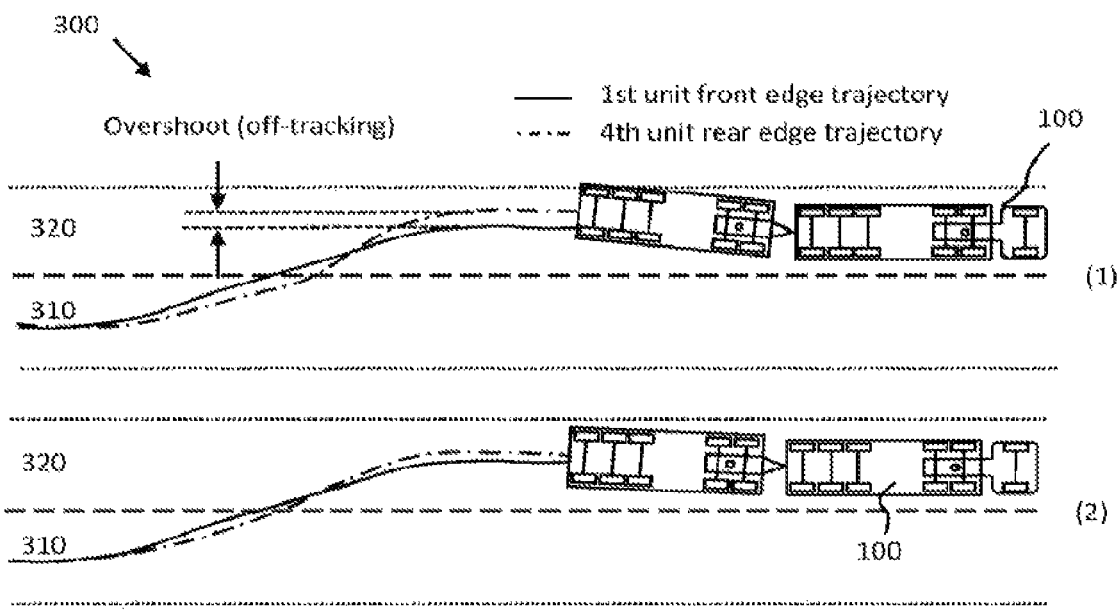
FIG. 3 schematically illustrates an off-tracking event.

A lane change scenario 300 is illustrated in FIG. 3. A heavy duty multi-trailer vehicle 100 executes an abrupt lane-change maneuver where the vehicle is initially following a right-hand side lane 310 and then changes to the left-hand side lane 320. The front edge trajectory of the first vehicle unit is illustrated by a solid line and the rear edge trajectory of the 4$^{th}$ vehicle unit, i.e., the second trailer 140, is shown as a dash-dotted line. The top example illustrates trajectories if no overshoot mitigating measures are taken, while the bottom example illustrates trajectories given the currently proposed off-tracking mitigation techniques.

By determining vehicle unit motion using, e.g., global positioning systems, vision-based sensors, wheel speed sensors, radar sensors and/or lidar sensors, and translating this vehicle unit motion into a local coordinate system of a given wheel 210*l*, 210*r* (in terms of, e.g., longitudinal and lateral velocity components), it becomes possible to accurately estimate wheel slip in real time by comparing the vehicle unit motion in the wheel reference coordinate system to data obtained from the wheel speed sensor arranged in connection to the wheel.

Figure 4:
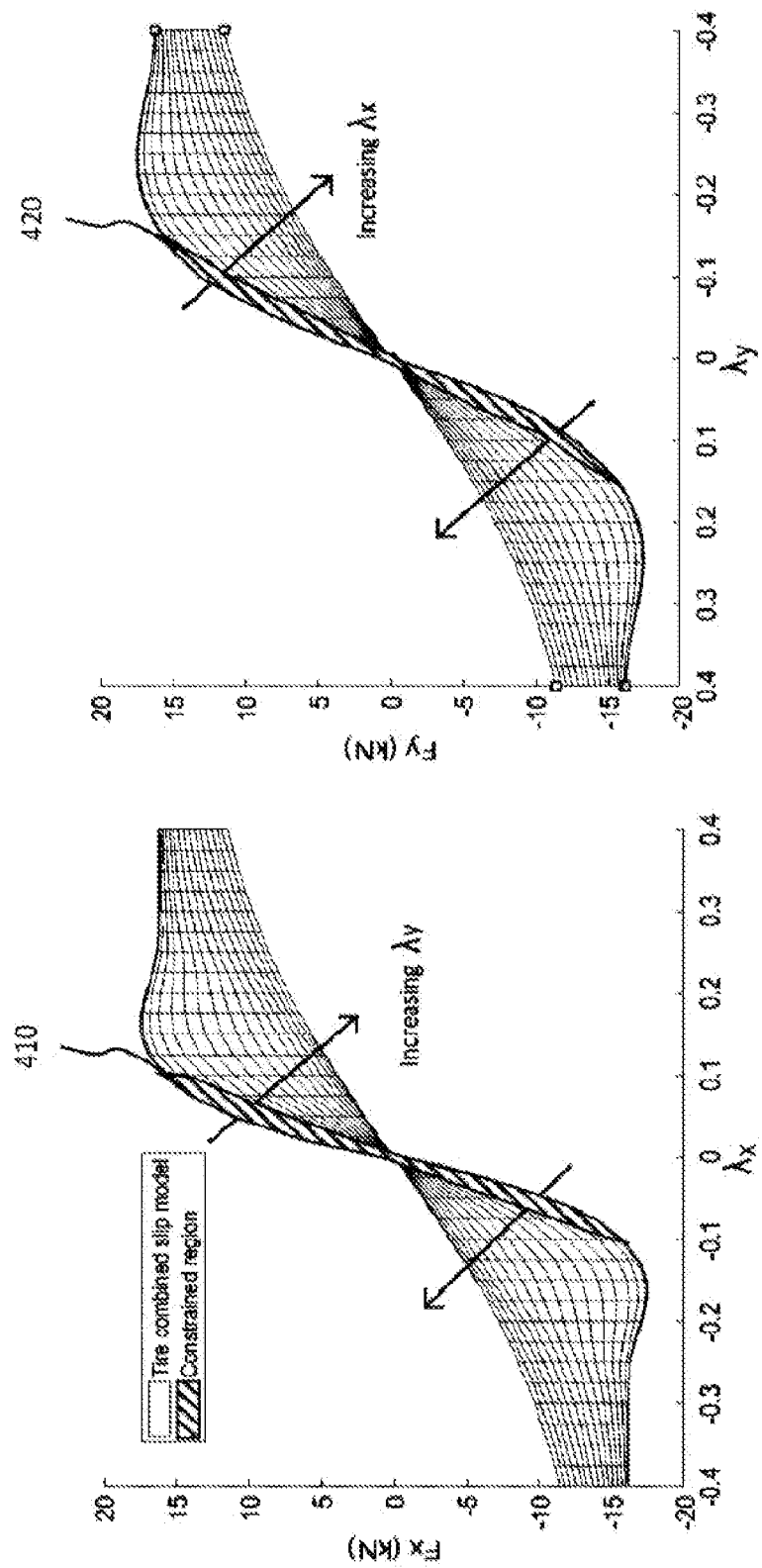
FIG. 4 is a graph illustrating a combined tyre slip model.

A tyre model, exemplified in FIG. 4, can be used to translate between a desired longitudinal or lateral tyre force Fx, Fy for a given wheel and an equivalent wheel slip $\lambda_x$, $\lambda_y$ for the wheel. The relationship between longitudinal force Fx and longitudinal wheel slip $\lambda_x$ depends on lateral wheel slip $\lambda_y$ and vv.

Wheel longitudinal slip $\lambda_x$ relates to a difference between wheel rotational velocity and speed over ground and will be discussed in more detail below. Wheel speed ω is a rotational speed of the wheel, given in units of, e.g., rotations per minute (rpm) or angular velocity in terms radians/second (rad/sec) or degrees/second (deg/sec). A tyre model is a model of wheel behavior which describes wheel force generated in longitudinal direction (in the rolling direction) and/or lateral direction (orthogonal to the longitudinal direction) as function of wheel slip. In "Tyre and vehicle dynamics", Elsevier Ltd. 2012, ISBN 978-0-08-097016-5, Hans Pacejka covers the fundamentals of tyre models. See, e.g., chapter 7 where the relationship between wheel slip and longitudinal force is discussed. The combined slip tire model has the form $$F_x = f_x(v_{wx}, v_{wy}, \omega))$$

$$F_y = f_y(v_{wx}, v_{wy}, \omega))$$

or, equivalently, through definition of longitudinal slip $\lambda_x$ and lateral slip $\lambda_y$ as in FIG. 4:

$$F_x = \bar{f}_x(\lambda_x, \lambda_y)$$

$$F_y = \bar{f}_y(\lambda_x, \lambda_y)$$

The longitudinal and lateral slips can, for example, be defined as $$\lambda_x = \frac{R\omega_x - v_x}{\max(|R\omega_x|, |v_x|)}$$

$$\lambda_y = \frac{v_y}{\max(|R\omega_x|, |v_x|)}$$

where R is the radius of the tire and $v_x$ and $v_y$ are longitudinal and lateral tire velocities in the tire frame of reference, and $\omega_x$ represents wheel rotational velocity in longitudinal direction.

The above definition of longitudinal wheel slip $\lambda_x$ is in accordance with SAE J670 (SAE Vehicle Dynamics Standards Committee Jan. 24, 2008). The longitudinal wheel slip is bounded between −1 and 1 and quantifies how much the wheel is slipping with respect to the road surface. Wheel slip is, in essence, a speed difference measured between the wheel and the vehicle. Thus, the herein disclosed techniques can be adapted for use with any type of wheel slip definition. It is also appreciated that a wheel slip value is equivalent to a wheel speed value given a velocity of the wheel over the surface, in the coordinate system of the wheel.

In FIG. 4 the area where the longitudinal and lateral slips result in forces that are always smaller than the peak allowable force are shown as constrained regions 410, 420. This means that, for example for lateral force, there is always some available force (the force increases) if the tire lateral slip increases. If then by optimization or other methods it is ensured that the vehicle control solution always remains in this constrained region, then excessive wheel slip and undesired events such as jack-knifing and trailer swing is avoided. In other words, by solving the vehicle control problem under these types of constraints, it is ensured that vehicle slip is always kept within reasonable limits.

It is noted that the road friction coefficient μ plays an important role in determining the range of longitudinal forces that can be generated.

To summarize, the VMM function manages both force generation and MSD coordination, i.e., it determines what forces that are required at the vehicle units in order to fulfil the requests from the TSM function, for instance to accelerate the vehicle according to a requested acceleration profile requested by TSM and/or to generate a certain curvature motion by the vehicle also requested by TSM. The forces may comprise e.g., yaw moments Mz, longitudinal forces Fx and lateral forces Fy, as well as different types of torques to be applied at different wheels.

For instance, the VMM function keeps track of the state of charge of the electrical energy system (ESS) of the vehicle, i.e., the traction batteries or the fuel cell system as well as the current state of any brake resistors, and determines how to best meet braking torque requirements by the electric machines and by the friction brakes $220l$, $220r$ on the different axles of the vehicle combination.

The interface between VMM and MSDs capable of delivering torque to the vehicle's wheels has, traditionally, been focused on torque based requests to each MSD from the VMM without any consideration towards wheel slip. However, this approach has significant performance limitations. In case a safety critical or excessive slip situation arises, then a relevant safety function (traction control, anti-lock brakes, etc.) operated on a separate control unit normally steps in and requests a torque override in order to bring the slip back into control. The problem with this approach is that since the primary control of the actuator and the slip control of the actuator are allocated to different electronic control units (ECUs), the latencies involved in the communication between them significantly limits the slip control performance. Moreover, the related actuator and slip assumptions made in the two ECUs that are used to achieve the actual slip control can be inconsistent and this in turn can lead to sub-optimal performance. Excessive wheel slip is also associated with energy waste and is therefore to be avoided from both a safety perspective as well as from an energy efficiency perspective.

Significant benefits can be achieved by instead using a wheel speed or wheel slip based request on the interface between VMM and the MSD controller, thereby shifting the difficult actuator speed control loop to the MSD controllers, which generally operate with a much shorter sample time compared to that of the VMM function. Such an architecture can provide much better disturbance rejection compared to a torque based control interface and thus improves the predictability of the forces generated at the tyre road contact patch.

The VMM and optionally also the MSD control units maintain information on $v_x$ (in the reference frame of the wheel), while a wheel speed sensor or the like can be used to determine $\omega_x$ (the rotational velocity of the wheel).

In order for a wheel (or tyre) to produce a wheel force, slip must occur. For smaller slip values the relationship between slip and generated force are approximately linear, where the proportionality constant is often denoted as the slip stiffness of the tyre. A tyre is subject to a longitudinal force $F_x$, a lateral force $F_y$, and a normal force $F_z$. The normal force $F_z$ is key to determining some important vehicle properties. For instance, the normal force to a large extent determines the achievable longitudinal tyre force $F_x$ by the wheel since, normally, $F_x \leq \mu F_z$, where μ is a friction coefficient associated with a road friction condition. The maximum available lateral force for a given lateral slip can be described by the so-called Magic Formula as described in "Tyre and vehicle dynamics", Elsevier Ltd. 2012, ISBN 978-0-08-097016-5, by Hans Pacejka.

The methods and control units disclosed herein relate to optimal brake distribution between axles of long combination vehicles (LCVs), or longer and heavier vehicles (LHVs), where there exists two, three or more articulation joints. LCVs (or LHVs) are energy- and cost-efficient compared to tractor-semitrailers. However, their performance measures are different from that of tractor-semitrailers. The high-speed off-tracking phenomenon is one of the drawbacks that must be considered in LCVs to reduce the risk of accidents on roads caused by these vehicles.

The optimal brake distribution is done with the objective of reducing high-speed off-tracking of the last vehicle unit, e.g., during evasive manoeuvres performed at high speed, such as obstacle avoidance manoeuvring or abrupt lane change.

The longitudinal force distribution according to the present technique is performed over axles, where the applied force is equal for right and left wheels of an axle, which simplifies the control method and reduces computational complexity. By allowing approximately 5 km/h of speed change compared to the vehicle speed before triggering the manoeuvre, the overshoot can decrease up to 50% in an A-double vehicle depending on the speed and the manoeuvre. The speed change during manoeuvre can happen either by reducing the speed of the vehicle, or increasing the speed before the manoeuvre by for example 2.5 km/h (using propulsion) and then reducing it by 5 km/h during the manoeuvre by optimal brake distribution, which results in a total of 2.5 km/h reduction in speed. If more speed reduction is allowed the overshoot can be reduced by more than 50%.

When studying the optimal brake distribution over axles, it was noted that the braking of the axles of the last units (in case of an A-double vehicle, the two last units) is necessary in order to reduce the overshoot. The optimal controller generates the axles' brake signals at the right time during the manoeuvre and with an appropriate amount of force. This time span where braking is performed is a part of the time during which the articulation angles are non-zero, when the brake forces act like for stretching the LCV, i.e. reducing one or more of the articulation angles of the vehicle combination. Also, the first unit may propel the vehicle combination, both for increasing the stretching effect and for mitigating speed reduction during the manoeuvre.

Figure 7:
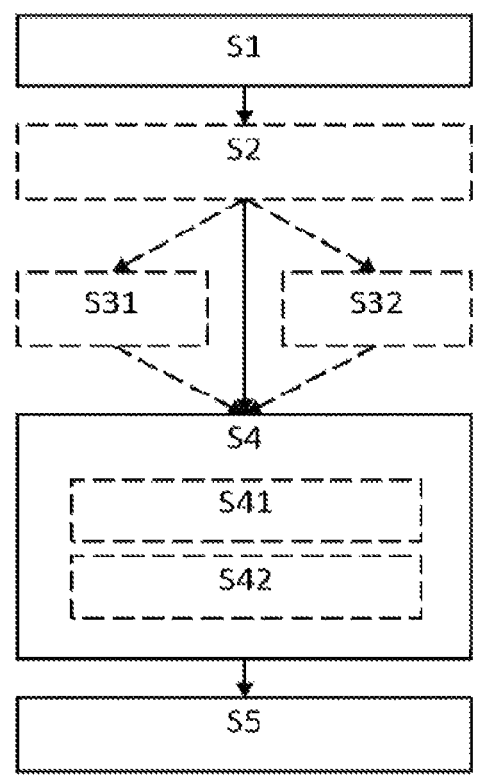
FIG. 7 is a flow chart illustrating methods.

With reference to FIG. 7, there is disclosed herein a method for reducing off-tracking by a multi-trailer heavy duty vehicle 100 during a maneuver. The method comprises obtaining S1 a model of vehicle dynamics describing dynamics of the multi-trailer heavy duty vehicle 100. The method also comprises determining S4 respective force trajectories a for two or more axles of the vehicle 100 as a solution to a non-linear optimal control problem (NOCP), where the NOCP is formulated with an objective to at least minimize trailer off-tracking, wherein the NOCP is formulated based on the model of vehicle dynamics.

One example model which can be applied here is described in "Computationally Efficient Nonlinear One- and Two-Track Models for Multitrailer Road Vehicles", by T. Ghandriz, B. Jacobson, P. Nilsson, L. Laine, and N. Fröjd, published in IEEE Access 9 Nov. 2020, ISSN: 2169-3536. This example model is nonlinear with a minimum number of states, and yet predicts the vehicle motion with a high quality. The model is based on Lagrangian dynamics. A brief description of this example model is given with reference to FIGS. 10 and 11, where the below table of notation will be used.

| Notation | Description |
|---|---|
| $A_f$ | Front area of the first vehicle unit |
| $c_d$ | Air drag coefficient |
| $C_{cy}$ | Tire cornering coefficient |
| $C_{cy0}$ | Cornering coefficient at the nominal tire normal force |
| $C_{cy0}^{ns}$ | Cornering coefficient at the nominal tire normal force of the non-steering tires |
| $C_{cy0}^{s}$ | Cornering coefficient at the nominal tire normal force of the steering tires |
| $c_{rg}$ | Axle-group roll stiffness |
| $C_x$ | Tire longitudinal stiffness |
| $C_y$ | Tire cornering (lateral) stiffness |
| e | Scaling factor of the friction ellipse tire model |
| $F_{air}$ | Air resistance force |
| $F_g$ | Force caused by gravity |
| $f_r$ | Tire rolling resistance coefficient |
| $F_{wRR}$ | Tire rolling resistance force |
| $F_{xw}$ | Actuation force component in the local wheel x-direction |
| $F_{yw}$ | Force component in the local wheel y-direction |
| $F_X$ | Force component in the global X-direction |
| $F_Y$ | Force component in the global Y-direction |
| $F_z$ | Vertical force normal to the road |
| $F_Z$ | Vertical force on a flat road, i.e., in the global Z-direction |
| $F_{z0}$ | Nominal tire vertical force |
| g | Gravitational acceleration |
| h | Height of COG of the vehicle unit |
| $h_{rg}$ | Axle-group roll center height |
| J | Vehicle unit yaw moment of inertia |
| $l_r$ | Tire relaxation length |
| L | Road-tire contact length |
| m | Vehicle unit mass (or equivalent mass) |
| M | Transformation matrix from vehicle local to global coordinates |
| $n_a$ | Maximum number of axles of vehicle units |
| $n_q$ | Total number of generalized coordinates |
| $n_{ta}$ | Number of tires per axle |
| $P_X$ | Global X position where a force acts |
| $P_Y$ | Global Y position where a force acts |
| q | Generalized coordinates |
| R | Deformed tire radius |
| s | Distance traveled |
| sa | Matrix defining the steerable axles |
| $s_x$ | Longitudinal slip |
| $s_y$ | Lateral slip |
| t | Time |
| T | System kinetic energy |
| $t_0$ | Start simulation (tuning) time |
| $t_e$ | End simulation (tuning) time |
| u | Input vector |
| ua | Matrix defining the units and axles |
| $u_{yg}$ | Maximum lateral force gradient |
| $u_{yg}^{ns}$ | Maximum lateral force gradient of the non-steering tires |
| $u_{yg}^{s}$ | Maximum lateral force gradient of the steering tires |
| V | System potential energy |
| $v_{wx}$ | Wheel hub velocity in the wheel local coordinate system |
| $v_X$ | Velocity component of the vehicle unit COG in the global X-direction |
| $v_Y$ | Velocity component of the vehicle unit COG in the global Y-direction |
| $w_t$ | Vehicle unit track width |
| x | State vector |
| X | Global X-coordinate of the vehicle unit COG |
| $x_a$ | Axle position relative to the vehicle unit COG |
| $X_{air}$ | Global X-position where the air resistance force acts |
| $x_c$ | Coupling joint position relative to the vehicle unitCOG |
| $X_w$ | Global X-position of a wheel |
| Y | Global Y-coordinate of the vehicle unit COG |
| $Y_{air}$ | Global Y-position where the air resistance force acts |
| $Y_w$ | Global Y-position of a wheel |
| δ | Road wheel steering angle |

| Notation | Description |
|---|---|
| θ | Articulation angle |
| $\lambda_b$ | Road banking angle |
| $\lambda_p$ | Road pitch angle (road grade) |
| μ | Road friction coefficient |
| $\mu_{slip}$ | Road friction at nonzero slip |
| $\mu_{stick}$ | Road friction at zero slip |
| $\rho_a$ | Air density |
| φ | Global yaw angle of the vehicle unit |
| $\varphi_{meas}$ | Measured vehicle unit yaw angle |
| $\varphi_r$ | Road global yaw angle |
| ω | Tire rotational speed |

Let ua and sa be binary matrices defining the units, axles of each unit and the steerable axles, e.g., for the single-track 6-axle version of the vehicle 100 shown above with the lumped group axles.

$$ua = [1, 1;\ 1, 0;\ 1, 1;\ 1, 0];$$

$$sa = [1, 0;\ 0, 0;\ 1, 0;\ 0, 0].$$

The Lagrange equation is given by $$\frac{d}{dt}\frac{\partial T}{\partial \dot{q}_l} - \frac{\partial T}{\partial q_l} + \frac{\partial V}{\partial q_l} = Q_l, l = 1, \ldots, n_g,$$

where $n_g=6$ is the total number of generalized coordinates of the system. The generalized coordinates q are given by $$q=[X_1,Y_1,\phi_1,\theta_1,\theta_2,\theta_3],$$

The generalized force $Q_l$ is given by $$Q_l = \sum_{k=1}^{n_f}\left(F_{Xk}\frac{\partial P_{Xk}}{\partial q_l} + F_{Yk}\frac{\partial P_{Yk}}{\partial q_l}\right), l = 1, \ldots, n_g,$$

The potential energy is zero. The kinetic energy is given by $$T = \frac{1}{2}\sum_{i=1}^{n_u}\left(m_i(v_{Xi}^2 + v_{Yi}^2) + J_i\dot{\phi}_i^2\right),$$

The position of the vehicle units COGs can be determined as $$\begin{bmatrix}X_i\\Y_i\end{bmatrix} = \begin{bmatrix}X_{i-1}\\Y_{i-1}\end{bmatrix} + \begin{bmatrix}x_{c(i-1)2}\ \cos(\phi_{i-1}) - x_{ci1}\ \cos(\phi_i)\\x_{c(i-1)2}\ \sin(\phi_{i-1}) - x_{ci1}\ \sin(\phi_i)\end{bmatrix},$$

$i = 2, \ldots, m_u,$ where, $\phi_i = \phi_{i-1} + \theta_{i-1}, i = 2, \ldots, n_u,$ The vehicle unit velocities in the global frame are $$v_{Xi} = \frac{dX_i}{dt}, v_{Yi} = \frac{dY_i}{dt}.$$

The transformation matrix $M_i$ from local to global frame is $$M_i = \begin{bmatrix} \cos(\phi_i) & -\sin(\phi_i) \\ \sin(\phi_i) & \cos(\phi_i) \end{bmatrix}.$$

and the axle global positions are given by $$\begin{bmatrix} X_{wij} \\ Y_{wij} \end{bmatrix} = \begin{bmatrix} X_i \\ Y_i \end{bmatrix} + M_i \begin{bmatrix} x_{aij} \\ 0 \end{bmatrix},$$

$$i = 1, \ldots, n_u, j = 1, \ldots, n_a, ua_{ij} \neq 0.$$

The position of the air resistance force is given by $$\begin{bmatrix} X_{air} \\ Y_{air} \end{bmatrix} = \begin{bmatrix} X_1 \\ Y_1 \end{bmatrix} + M_1 \begin{bmatrix} x_{a11} \\ 0 \end{bmatrix}.$$

The equation of motion, therefore, is on the form $$F(x,\dot{x},u)=0,$$

for the state vector x $$x=[X_1,Y_1,\phi_1,v_{X1},v_{Y1},\dot{\phi}_1,\theta_i,\dot{\theta}_i], i=1\ldots,n_u-1,$$

where the input vector u is $$u=[F_{xw11},F_{xw21},F_{xw21},F_{xw31},F_{xw32},F_{xw41},\delta_{11},\delta_{31}]$$

By conversion of velocities $v_{x1}$ and $v_{y1}$ from global frame to the first unit local frame and differentiation by the chain rule, $$\frac{\partial T}{\partial \dot{X}_1} = \frac{\partial T}{\partial v_{x1}}\frac{\partial v_{x1}}{\partial \dot{X}_1} + \frac{\partial T}{\partial v_{y1}}\frac{\partial v_{y1}}{\partial \dot{X}_1} = \frac{\partial T}{\partial v_{x1}}\cos(\phi_1) - \frac{\partial T}{\partial v_{y1}}\sin(\phi_1),$$

$$\frac{\partial T}{\partial \dot{Y}_1} = \frac{\partial T}{\partial v_{x1}}\frac{\partial v_{x1}}{\partial \dot{Y}_1} + \frac{\partial T}{\partial v_{y1}}\frac{\partial v_{y1}}{\partial \dot{Y}_1} = \frac{\partial T}{\partial v_{x1}}\sin(\phi_1) + \frac{\partial T}{\partial v_{y1}}\cos(\phi_1),$$

$$\frac{\partial T}{\partial \phi_1} = \frac{\partial T}{\partial v_{x1}}\frac{\partial v_{x1}}{\partial \phi_1} + \frac{\partial T}{\partial v_{y1}}\frac{\partial v_{y1}}{\partial \phi_1} + \frac{\partial T}{\partial g(\phi_1)}\frac{\partial g(\phi_1)}{\partial \phi_1} = \frac{\partial T}{\partial v_{x1}}v_{y1} - \frac{\partial T}{\partial v_{y1}}v_{x1},$$

$$\frac{\partial g(\phi_1)}{\partial \phi_1} = 0.$$

The new set of states then is $$x=[X_1,Y_1,\phi_1,v_{x1},v_{y1},\dot{\phi}_1,\theta_i,\dot{\theta}_i], i=1,\ldots,n_u-1.$$

Conversion from the time domain to the space domain can be done by the following change of variables $$\frac{d(\cdot)}{dt} = \frac{d(\cdot)}{ds}\frac{ds}{dt} \approx v_{x1}\frac{d(\cdot)}{ds},$$

$$\frac{d^2(\cdot)}{dt^2} = \frac{d}{dt}\left(\frac{d(\cdot)}{ds}\frac{ds}{dt}\right) = v_{x1}^2\frac{d^2(\cdot)}{ds^2} + v_{x1}\frac{dv_{x1}}{ds}\frac{d(\cdot)}{ds},$$

where is has been assumed that $$\frac{ds}{dt} \approx v_{x1}.$$

Any nonlinear tire model can be used to describe $F_{yw}$ as a function of lateral and longitudinal slips, for instance the one exemplified in FIG. 4. The tire forces in the global frame can then be defined as $$\begin{bmatrix} F_X \\ F_Y \end{bmatrix} = \begin{bmatrix} \cos(\phi+\delta) & -\sin(\phi+\delta) \\ \sin(\phi+\delta) & \cos(\phi+\delta) \end{bmatrix}\begin{bmatrix} F_{xw} \\ F_{yw} \end{bmatrix},$$

The gravitational force acting on the COG of unit i is given by $$F_{gxi}=m_i g \sin(\lambda_{pi}),$$

$$F_{gyi}=m_i g \sin(\lambda_{bi}),$$

assuming that the road pitch and banking angles remain constant within a unit length, where $\lambda_{pi}$ is positive downhill in front of the vehicle unit, and $\lambda_{bi}$ is positive downhill at the left side of the vehicle unit.

The gravitational forces the global frame are $$\begin{bmatrix} G_{gXi} \\ F_{gYi} \end{bmatrix} = \begin{bmatrix} \cos(\phi_{ri}) & -\sin(\phi_{ri}) \\ \sin(\phi_{ri}) & \cos(\phi_{ri}) \end{bmatrix}\begin{bmatrix} F_{gxi} \\ F_{gyi} \end{bmatrix},$$

The road yaw angle in the global frame $\phi_{ri}$, where we assumed $\phi_{ri}=\phi_i$.

The rolling resistance forces $F_{wRR}$ are $$F_{wRR} = -f_r F_z \frac{v_{x1}}{|v_{x1}|},$$

and in the global coordinates are $$\begin{bmatrix} F_{XRR} \\ F_{YRR} \end{bmatrix} = \begin{bmatrix} \cos(\phi_i+\delta) & -\sin(\phi_i+\delta) \\ \sin(\phi_i+\delta) & \cos(\phi_i+\delta) \end{bmatrix}\begin{bmatrix} F_{wRR} \\ 0 \end{bmatrix},$$

and the air resistance force is $$F_{xair} = -0.5\, A_f\, c_d\, \rho_a\, v_{x1}^2 \frac{v_{x1}}{|v_{x1}|},$$

$$\begin{bmatrix} F_{Xair} \\ F_{Yair} \end{bmatrix} = \begin{bmatrix} \cos(\phi_1) & -\sin(\phi_1) \\ \sin(\phi_1) & \cos(\phi_1) \end{bmatrix}\begin{bmatrix} F_{xair} \\ 0 \end{bmatrix},$$

Based on this model, or based on some similar model of vehicle dynamics, an NOCP can be defined and solved in real-time. The accuracy and the performance of the controller depends on the accuracy of the model of vehicle dynamics and parameters. It has been found, however, that the model discussed above provides good results. The present techniques mitigates high-speed off-tracking through optimal distribution of longitudinal forces between axles (optionally lumped axles) of the multi-trailer vehicle.

Figure 6:
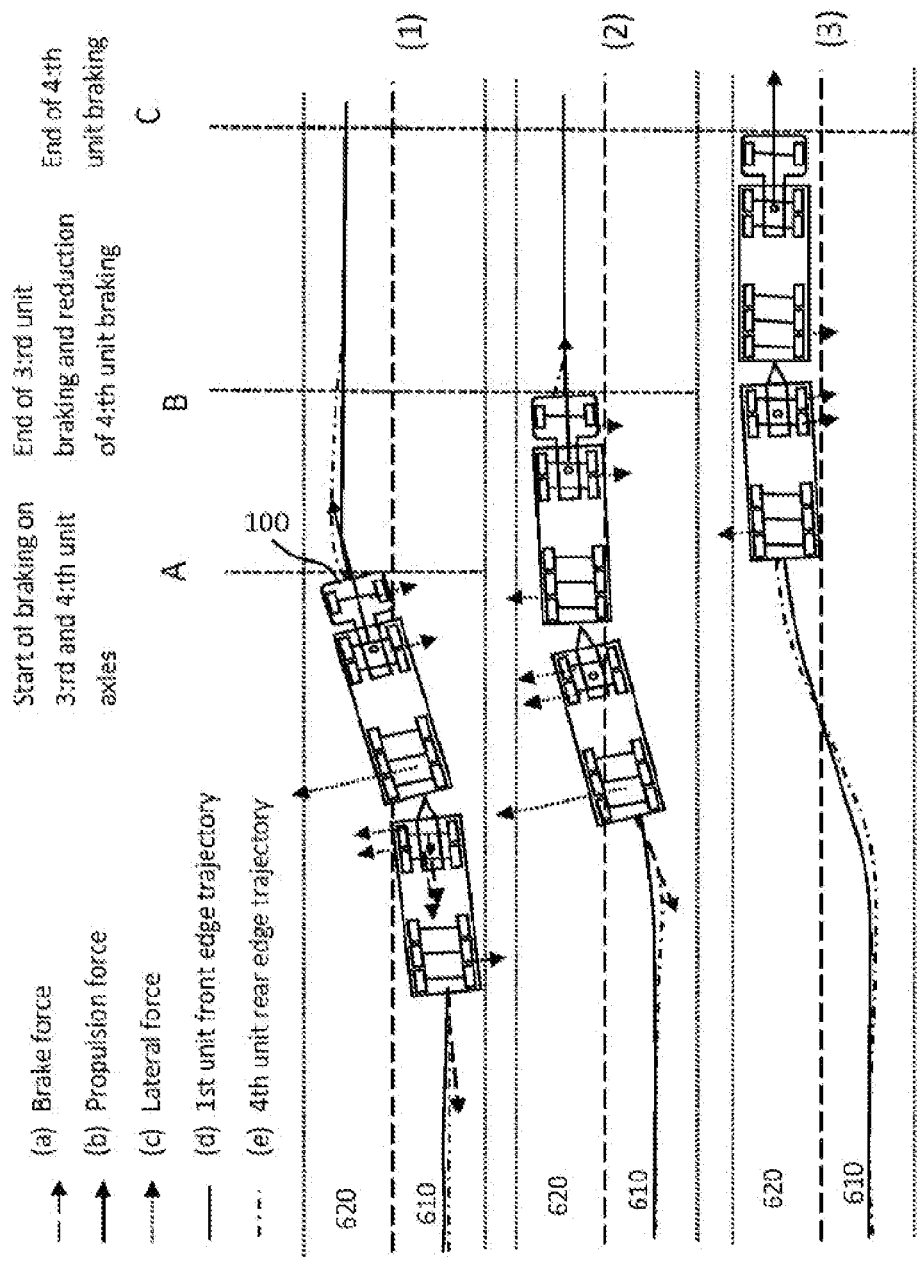
FIG. 6 shows an example axle force distribution during a lane change maneuver.

An example A-double 100 vehicle is shown in FIG. 6, executing a lane change manoeuvre from a first lane 610 to a second lane 620. Example longitudinal forces are shown in the figure. Dashed arrows indicate braking forces and solid lines indicate propulsion forces, while dash-dot arrows indicate the lateral forces. The front edge trajectory of the first vehicle unit 110 is indicated by solid lines, while the rear edge trajectory of the fourth vehicle unit (i.e. the second trailer unit 140) is indicated by dash-dot lines. The vehicle needs to brake only the axles of the third and the fourth vehicle units, i.e., the dolly and the second semitrailer, to reduce the off-tracking and the end of single-lane-change manoeuvre. The braking should be done at a right time (or position) regarding the vehicle orientation, speed, and steering angle. Referring again to FIG. 6, the dotted line A shows the position at which braking is commenced on the 3:rd and 4:th unit axles, i.e. the front and rear axles of the second trailer unit 140. The dotted line B shows the position at which braking may be ended at on the 3:rd unit axles and reduced on the 4:th unit axles, and the dotted line C shows the position at which braking is ended. The off-tracking at the beginning of the single-lane-change manoeuvre can be reduced in a similar manner, but the required forces are not shown in the figures.

The longitudinal forces act as inputs (decision variables) to the NOCP. By solving the NOCP, with the objective of minimizing the off-tracking, the optimal trajectories of the longitudinal forces are found throughout the manoeuvre. These longitudinal forces are then converted to torque requests that are met by the braking and propulsion actuators, or, as discussed above, to wheel slip or wheel speed requests.

Moreover, the generated requests, as the result of solving the NOCP, are guaranteed to be feasible for the lower-level MSD controllers to meet without generating excessive wheel slip. This is because proper constraints based on the tyre model and the road friction limit as well as the power limits are considered in the NOCP. Consequently, controlling S5 motion of the heavy duty vehicle 100 during the maneuver can be advantageously based on the determined force trajectories a. The force trajectories may, e.g., comprise target tyre force trajectories and/or target wheel slip trajectories for at least two axles to be followed during the maneuver. Alternatively, the force trajectories comprises target wheel torque trajectories or target axle torque trajectories to be followed during the maneuver.

Figure 5:
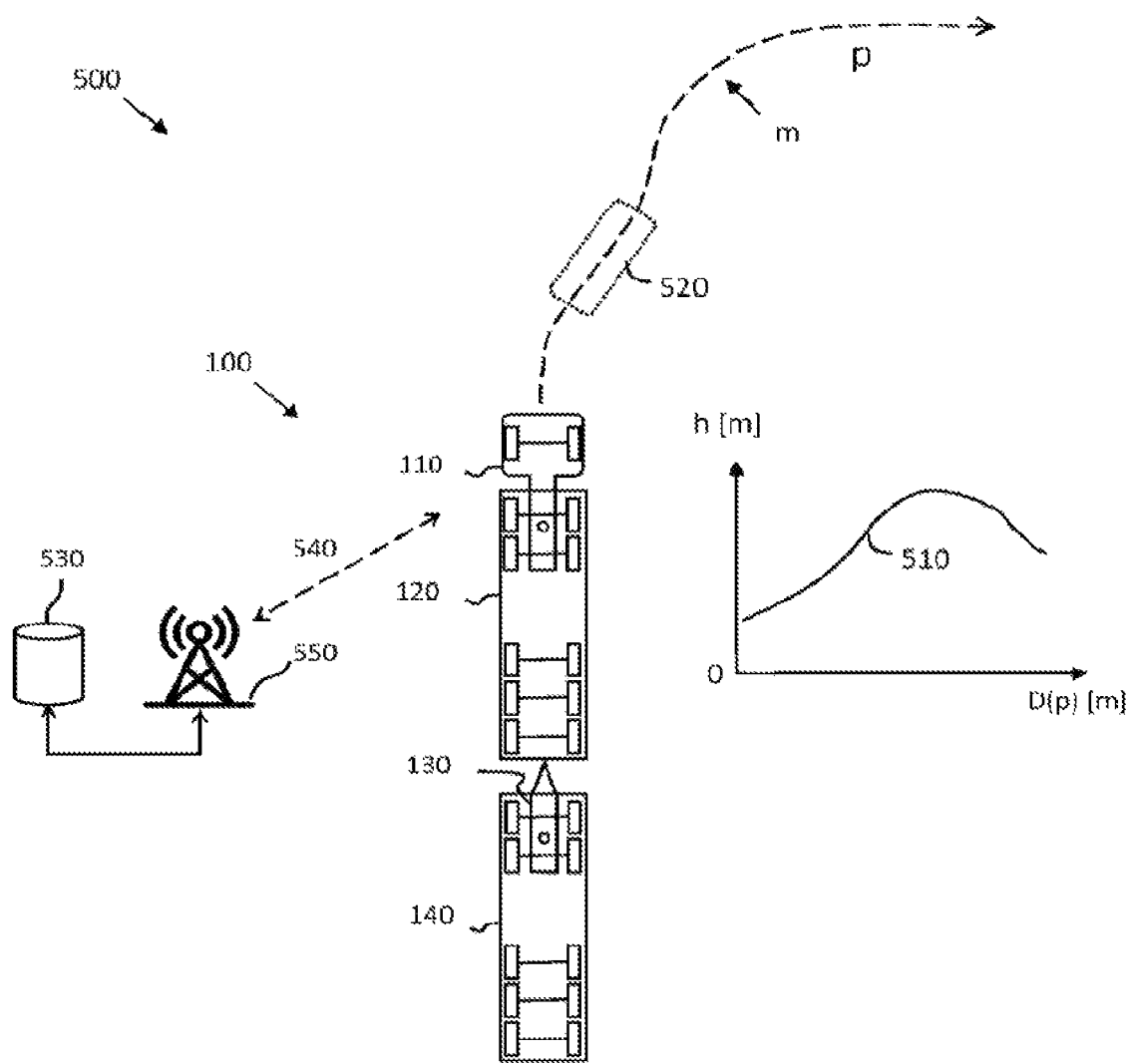
FIG. 5 schematically illustrates a vehicle traveling along a path

FIG. 5 schematically illustrates a vehicle 100 travelling along a path p. The path may, for instance, be a stretch of road associated with a height profile 510 and perhaps also a section with reduced friction 520, as well as a turn maneuver m to be executed by the vehicle 100. The methods disclosed herein may comprise obtaining S2 information related to a road friction coefficient along the upcoming vehicle path p. This means that the vehicle 100 either estimates a road friction coefficient μ using on-board sensors such as cameras, infra-red sensors, and thermometers, or receives road friction reports from a remote server 530 by wireless link 540 via a radio base station 550.

The NOCP is then formulated to account for the road friction coefficient. For instance, a variation in road friction condition may warrant a reduction in braking force by one or more axles in order to prevent excessive wheel slip.

The method may also comprise configuring S31 a limit $F_{max}$ on axle forces given by $$F_{max} = S\mu F_z$$

where S is a safety factor smaller than 1.0, and wherein the NOCP is constrained by the limit $F_{max}$ on axle forces. This constraint on wheel force takes road friction coefficient into account and configures a safety margin to account for discrepancies in the road friction data.

According to aspects, the method also comprises configuring S32 lateral and longitudinal wheel slip limits $\lambda_{lim}$ for at least two wheels 115, 125, 135, 145 of an axle on the heavy duty vehicle 100. The lateral and longitudinal wheel slip values are related to respective lateral and longitudinal tyre force values $F_x$, $F_y$, via a pre-determined combined tyre slip model, as discussed in connection to FIG. 4, wherein the NOCP is constrained by the lateral and longitudinal wheel slip limits $\lambda_{lim}$.

In case the heavy duty vehicle 100 has sufficient on-board data processing capability, then the method may comprise solving S41 the NOCP in real-time. Alternatively, parts of the NOCP may be solved remotely, such as at the remote server 530 illustrated in FIG. 5.

However, in case the vehicle lacks sufficient data processing capability, the method may comprise obtaining S42 a solution to the NOCP from a pre-determined look-up table (LUT) which comprises solutions to a plurality of NOCPs solved for different NOCP input parameters. A solution can then be selected from the LUT in dependence of a respective set of parameters of a current operating scenario of the heavy duty vehicle 100 and in dependence of the maneuver. This selection can be performed in real time despite limited processing capability, since, in this case, for reducing the off-tracking, the vehicle controller simply reads the correct brake and propulsion force trajectories from a look-up table based, e.g., on the steering angle input and the speed of the vehicle. In other words, the method optionally comprises obtaining target brake and propulsion force trajectories from the LUT based on a steering angle of the vehicle 100 and based on a speed of the vehicle 100. According to an example, the NOCP can be defined as follows, where it is appreciated that a any of the constraints can be assumed not applicable, depending on the vehicle type etc.

| Find | longitudinal force on lumped axles (and the road steering angle of the first axle of the tractor if desired path is given) | |
|---|---|---|
| to minimize | off-tracking (the deviation of the path of the second to the last units from the path of the front edge of the first unit, or deviation of the path of all units from a desired path.) | (1.1) |
| subject to | Multi-trailer vehicle combined lateral and longitudinal dynamic equations | (1.2) |
| | battery SOC dynamics, | (1.3) |
| | ICE torque upper limit, | (1.4) |
| | EM torque limits, | (1.5) |
| | battery SOC limits, | (1.6) |
| | battery power limits, | (1.7) |
| | Road speed limits, | (1.8) |
| | ICE torque (force) lower limit, | (1.9) |
| | constraints on total tire force of the all lumped axles based on the tire combined tire slip model, | (1.10) |

Constraints 1.3-1.7 and 1.9 and 1.10 are included to make sure that the generated longitudinal forces are feasible and can be met by the lower level controllers, where the propulsion source on different axles can be either electric motors (EM) or an internal combustion engine (ICE), or both. Instead of or in addition to these constraints and constraint 1.10, a simpler constraint based on road friction limit and the axle load can be used, i.e., $F_{max} = S \mu F_z$, where θ is the road friction coefficient, S is a safety (or conservatively) factor, and $F_z$ is the axle vertical force. Moreover, the decision variables in the example NOCP above may include longitudinal forces rather than exclusively the steering angle(s).

The set of states of the NOCP may comprise longitudinal speed of a first vehicle unit 110, lateral speed of the first vehicle unit 110, yaw angle of the first vehicle unit 110, as well as respective derivatives, and also articulation angles of the heavy duty vehicle 100 and their derivatives.

It is appreciated that the force trajectories for the two or more axles of the vehicle 100 have equal tyre forces for each side of the respective axle.

The input-output system of the present technique can, according to an example, be described as follows.

Inputs:
  vehicle estimated parameters including vehicle units' mass, inertia, size, position of axles, centre of gravity, size of tires, position of coupling joints and number of wheels per axle;
  road friction estimation;
  road grade and banking, during the manoeuvre;
  steering wheel input or the desired path;
  battery, EM and ICE power and torque limits (these are not needed if Eq. (2) is used);
  vehicle speed (state feedback);

Outputs:
  Axles' (and lumped axles') optimal longitudinal force (or torque) requests.

An example NOCP in mathematical form can be defined as follows. The cost function is a convex quadratic cost of deviation of the vehicle path from a given trajectory or the trajectory of the towed units from the path of the towing unit.

This type of NOCP can be solved using methods such as model predictive control (both linear or nonlinear).

The stage cost function L in the space domain can be defined as $$L(x(s), u(s), s) = \sum_{i=1}^{n_u} ((X_i(x(s), s) - X_{desi}(s))^T H_X (X_i(x(s), s) - X_{desi}(s)) + (Y_i(x(s), s) - Y_{desi}(s))^T H_Y (Y_i(x(s), s) - Y_{desi}(s))),$$

where $H_X$ and $H_Y$ are the weighting matrices, $n_u$, $[X_i, Y_i]$ denote the number of vehicle units and the global coordinates of unit i COG, respectively, and $X_{desi}$, $Y_{desi}$ are the global coordinates of the desired path of COGs. The objective is to reduce the distance between the trajectory of all the units and the given desired trajectory. Given the actual trajectory or the (desired trajectory) of the COG of the 1st unit, the desired trajectories of the other units can be determined as $$X_{desi}(s) = X_{des1}(s_i), i = 2, \ldots, n_u$$

$$Y_{desi}(s) = Y_{des1}(s_i), i = 2, \ldots, n_u,$$

where $$s_i = s + \sum_{l=1}^{i-1} x_{cl2} - \sum_{l=2}^{i} x_{cl1}, i = 2, \ldots, n_u,$$

where $x_{cl1}$ an $x_{cl2}$ are the vehicle unit front an rear coupling points local x-coordinates relative to the unit's COG.

Figure 12:
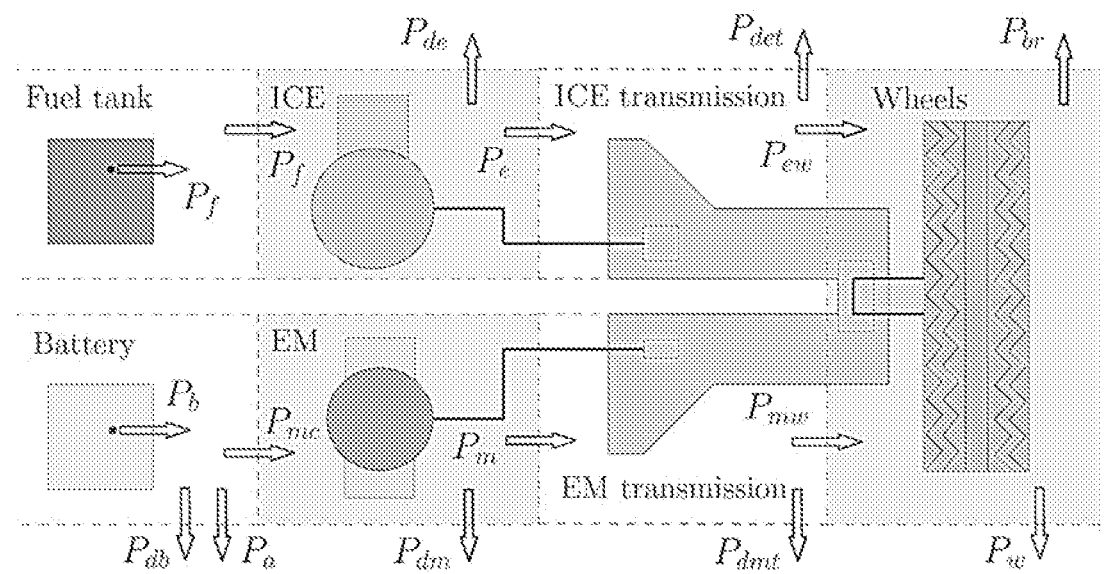
FIG. 12 schematically illustrates a model of a vehicle powertrain.

In addition, $[X_i, Y_i]$ are nonlinear functions of states that must be linearized around the linearization reference state trajectories for making the cost function convex and quadratic. The NOCP includes a model of a vehicle powertrain, as illustrated schematically in FIG. 12. For example, dynamic equations of a parallel hybrid powertrain comprising one or more electric machines (EM) and internal combustion engines (ICE) can be derived, as can equations for evaluating fuel consumption, electric energy consumption, state of charge of batteries, and energy dissipated in different parts of the powertrain. Notably, conventional and fully electric powertrains can be derived from the equations of the hybrid powertrain in a straight-forward manner by setting weight parameters to effectively zero out contributions from the ICE or from the EM.

The total force at the wheels $F_w(t)$, i.e., the sum of forces acting on wheels caused by propulsion and braking, at time t, is given by $$F_w(t) = m\dot{v}_x(s) + F_g(s(t)) + F_{roll}(S(t)) + F_{air}(v_x(t)) + F_{steer}(s(t))$$

where m is the vehicle total mass or equivalent total mass, s(t) is the travelled distance at time t, $F_g$ is the road grade, $F_{roll}$ is the rolling resistance, and $F_{air}$ is the air drag. This relationship is generally known and will therefore not be discussed in more detail herein. The terms can be determined as $$F_g(s(t)) = -m\, g\, \sin(\lambda_p(s(t)))$$

$$F_{roll}(S(t)) = m\, g\, f_r\, \cos(\lambda_p(s(t)))$$

$$F_{air}(v_x(t)) = 0.5\, \rho_a A_f c_d v_x(t)^2$$

where g, $\lambda_p$, $f_r$, $\rho_a$, $A_f$, and $c_d$ represent the gravitational constant, road grade (positive downhill), rolling resistance coefficient, air density, equivalent vehicle front area and air drag coefficient, respectively.

The term $F_{steer}$ approximates all forces caused by steering and from the articulation angles, i.e., side slips of the tires, as well as the rotational inertia. This term is close to zero in straight road driving and is negligible for single-unit vehicles. However, for articulated vehicles on curved roads, the term cannot be neglected for accurate state and energy consumption estimations.

The total power at the wheels $P_w(t) = F_w(t)v_x(t)$, where $v_x(t)$ is longitudinal velocity.

The energy flow (i.e., power transfer) between different powertrain subsystems for a given interval of time will now be described in relation to FIG. 10.

Let $P_f$, $P_e$, $P_{de}$, $P_{ew}$, and $P_{det}$ denote, respectively, powers associated with the fuel tank, with the ICE output, dissipated by the ICE, at the ICE transmission output and dissipated in ICE transmission, respectively. On the electric propulsion side, let $P_b$, $P_{db}$, $P_a$, $P_{mc}$, $P_{dm}$, $P_m$, $P_{dmt}$, $P_{mw}$ represent the powers provided by or stored in the battery, dissipated in the battery, used for auxiliaries, consumed or regenerated by EM, dissipated in EM, at EM output/input to/from transmission, dissipated in EM transmission and at output/input to/from wheels, respectively. Likewise, let $P_{br}$ be the friction brake power. Then, by defining the energy flow as positive if it flows out of a subsystem, e.g., all dissipative terms are positive, the power balance equation for each subsystem can be written as follows. A power balance can be assumed since there is no energy storage or generation inside the powertrain, except that in the fuel tank and battery, i.e., no inertial flywheels or elastic shafts are modelled.

$$P_e + P_{de} - P_f = 0$$

$$P_{ew} + P_{det} - P_e = 0$$

$$P_w + P_{br} - P_{ew} - P_{mw} = 0$$

$$P_{mw} + P_{dmt} - P_m = 0$$

$$P_m + P_{dm} - P_{mc} = 0$$

$$P_{mc} + P_{db} - P_a - P_b = 0$$

In the above equations, function arguments are omitted for increased readability. Again, these relationships are known in general and will therefore not be discussed in more detail herein. For example, the powertrain component dissipations are, in general, nonlinear functions of speed, component power, selected ICE gear, and selected EM gear. Furthermore, terms describing the inertia of rotating parts in the driveline and wheels and energy loss due to tire slip are neglected; however, the inertia of rotating parts can be taken into account by considering the equivalent additional mass.

The power dissipation of the ICE and the EM can, e.g., be modelled by direct use of data from measured maps or by using high-degree nonlinear fitted curves. Measurements can, e.g., be performed for varying torques and angular speeds. The torque and angular speed of the ICE and the EM can be calculated based on their power and vehicle speed as follows $$\omega_e(t) = \frac{r_e(\gamma_e(t))}{R} v_x(t)$$

$$T_e(t) = \frac{1}{\omega_e(t)} P_e(t)$$

$$\omega_m(t) = \frac{r_m(\gamma_m(t))}{R} v_x(t)$$

$$T_m(t) = \frac{1}{\omega_m(t)} P_m(t)$$

where $R$, $r_e$, $T_e$, $\omega_e$, $r_m$, $T_m$, and $\omega_m$ denote the wheel radius, gear ratio from wheel to engine, engine torque, engine speed, gear ratio from wheel to EM, EM torque and EM speed, respectively.

Furthermore, power P, energy E, force F, torque T and velocity $v_x$ are related according to $$P(s) = \frac{dE(s)}{dt} = v_x(s) \frac{dE(s)}{ds} = v_x(s) F(s) = \omega(s) T(s)$$

A general polynomial surface fitting of degree n can be applied to represent ICE fuel energy rate $\dot{E}_f = P_f$ and EM consumed power $P_{mc}$. Other surface fitting functions can of course also be used with similar effect.

The battery can be modelled, e.g., as a constant open circuit voltage, $V_{oc}$, with resistance R. Therefore, the battery dissipated energy can be calculated as follows, assuming that the voltage drop due to battery resistance is negligible.

$$P_{db}(P_{mc}(t), P_a(t)) = \frac{R}{V_{oc}^2}(P_{mc} + P_a)^2$$

Furthermore, transmission dissipation can be assumed to be linear with respect to the power input being independent of gear selection:

$$P_{det}(P_e(t)) = P_e(t) - \eta_{te} P_e(t)$$

$$P_e(t) \geq 0$$

$$P_{dmt}(P_m(t)) = \begin{cases} P_m(t) - \eta_{tm} P_m(t) & \text{if } P_m(t) > 0 \\ -\left(\frac{P_m(t)}{\eta_{tm}} - P_m(t)\right) & \text{if } P_m(t) \leq 0 \end{cases}$$

where $\eta_{te}$, $\eta_{tm}$ represent the transmission efficiency of the ICE and the EM, respectively. The negative sign in the second part above is needed in order to keep $P_{dmt}$ positive.

In addition to the energy balance of the powertrain components, their capability limits in transforming energy can be considered. The limits of transforming energy in the engine and EM are enforced by limiting the maximum and minimum torque that can be produced.

Finally, the storage capacity and power of the battery is of course limited. The state of charge (SOC) is used herein as a state and a measure for battery capacity.

$$SOC(t_f) = SOC(t_0) - \frac{1}{E_{bmax}} \int_{t_0}^{t_f} P_b(t) dt$$

where $E_{bmax}$ denotes the maximum energy capacity of the battery.

Let s be a vehicle path variable, $F_{xx}$ denote a force corresponding to the above-mentioned powers $P_{xx}$ (as illustrated, e.g., in FIG. 10), $\gamma_e$ is integer gear of ICE, $\gamma_m$ is integer gears of EM, $R_w$ is wheel radius, $V_b^2$ is the battery open circuit voltage, $r_e$ is the ICE gearbox and final ratio and $r_m$ is the EM gearbox and final ratio.

The optimization then can be, for example, defined as:

Find $F_{xij}(s)$, $i = 1, \ldots, n_u$, $j = 1, \ldots, n_a$, $ua_{ij} \neq 0$, to minimize $J^{nl} = \int_{s=s_0}^{s=s_f} L(x(s), u(s), s) ds$, subject to vehicle dynamic equations:

$$F\left(x(s), \frac{dx(s)}{ds}, A_u(s) u(s), s\right) = 0,$$

battery SOC dynamic:

$$\frac{dsoc(s)}{ds} = -\frac{1}{E_{bmax}}\left(F_{mc}(s) + \frac{Rv_x(s)}{V_b^2}(F_{mc}(s) + F_a(s))^2 + F_a(s)\right),$$

initial and terminal states:

$v(s_0) = v_0$, $soc(s_0) = soc_0$, $t(s_0) = t_0$, $soc(s_f) = soc_f$,

ICE torque upper limit:

$$\frac{R_w}{r_e(\gamma_e(s))} F_e(s) - \min\left\{\sum_{i=0}^{3} b_{ij}^e \left(\frac{r_e(\gamma_e(s))}{R_w} v_x(s)\right)^j, i = 1, \ldots, 4\right\} \leq 0,$$

EM torque limits:

$$\frac{R_w F_{mw}(s)}{r_m(\gamma_m(s)) \eta_{tm}} - \min\left\{\sum_{j=0}^{3} b_{ij}^m \left(\frac{r_m(\gamma_m(s))}{R_w} v_x(s)\right)^j, i = 1, 2\right\} \leq 0,$$

$$-\frac{R_w F_{mw}(s) \eta_{tm}}{r_m(\gamma_m(s))} + \max\left\{\sum_{j=0}^{3} b_{ij}^m \left(\frac{r_m(\gamma_m(s))}{R_w} v_s(s)\right)^j, i = 3, 4\right\} \leq 0,$$

battery SOC limits:

$soc_{min} - soc(s) \leq 0$, $soc(s) - soc_{max} \leq 0$, battery power limits:

$$p_{bmin} - v_x(s)\left(F_{mc}(s) + \frac{Rv_x(s)}{V_b^2}(F_{mc}(s) + F_a(s))^2 + F_a(s)\right) \leq 0,$$

$$v_x(s)\left(F_{mc}(s) + \frac{Rv_x(s)}{V_b^2}(F_{mc}(s) + F_a(s))^2 + F_a(s)\right) - p_{bmax} \leq 0,$$

-continued speed limits:

$v_{min}(s) - v_x(s) \leq 0,$ $v_x(s) - v_{max}(s) \leq 0,$

ICE torque (force) lower limit:

$-F_e(s) \leq 0,$ friction brake lower limit:

$-F_{bri}(s) \leq 0,$ tire model:

$F_{xij} = f_x(v_{xij}, v_{yij}, w_{ij}),$ $F_{yij} = f_y(v_{xij}, v_{yij}, w_{ij}),$ tire or axle force limits:

$|F_{xij}(s)| \leq F_{xij,max}(s)$

The performance of the proposed NOCPs are not limited to the single-lane-change manoeuvre. It can be used for any high-speed manoeuvres where the optimal longitudinal force distribution can help improved vehicle performance and stability. This is because the defined optimal control problem is nonlinear and is based on a nonlinear vehicle model that includes nonlinear lateral and longitudinal dynamic of the multi-trailer vehicles as well as nonlinear combined slip tire models. For the same reason, the problem definition can be extended to include any type of LCV rather than only the A-double. Moreover, the methods can work together with the optimal steering of the other axles and can work for the combined optimal control and distribution of steering, propulsion and braking, in all speed ranges, i.e., from a low-speed to high-speed and in any manoeuvre.

Figure 8:
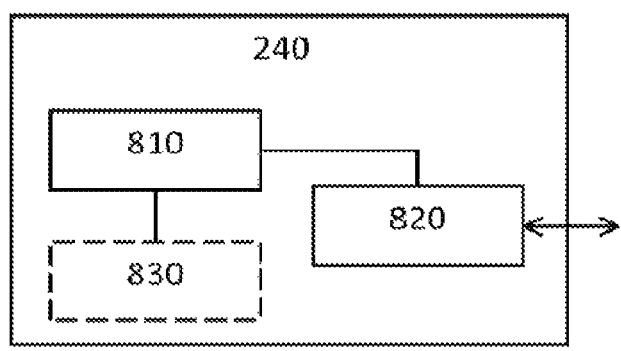
FIG. 8 schematically illustrates a control unit.

FIG. 8 schematically illustrates, in terms of a number of functional units, the components of a control unit 240 according to embodiments of the discussions and methods disclosed herein. This control unit 240 may be comprised in the vehicle 100, e.g., in the form of a vehicle motion management (VMM) unit configured to perform force allocation and the like. Processing circuitry 810 is provided using any combination of one or more of a suitable central processing unit CPU, multiprocessor, microcontroller, digital signal processor DSP, etc., capable of executing software instructions stored in a computer program product, e.g. in the form of a storage medium 830. The processing circuitry 810 may further be provided as at least one application specific integrated circuit ASIC, or field programmable gate array FPGA.

Particularly, the processing circuitry 810 is configured to cause the control unit 240 to perform a set of operations, or steps, such as the methods discussed in connection to FIGS. 8A and 7B. For example, the storage medium 830 may store the set of operations, and the processing circuitry 810 may be configured to retrieve the set of operations from the storage medium 830 to cause the control unit 240 to perform the set of operations. The set of operations may be provided as a set of executable instructions. Thus, the processing circuitry 810 is thereby arranged to execute methods as herein disclosed.

The storage medium 830 may also comprise persistent storage, which, for example, can be any single one or combination of magnetic memory, optical memory, solid state memory or even remotely mounted memory.

The control unit 240 may further comprise an interface 820 for communications with at least one external device, such as an electric machine or a gearbox. As such the interface 820 may comprise one or more transmitters and receivers, comprising analogue and digital components and a suitable number of ports for wireline or wireless communication.

The processing circuitry 810 controls the general operation of the control unit 240, e.g., by sending data and control signals to the interface 820 and the storage medium 830, by receiving data and reports from the interface 820, and by retrieving data and instructions from the storage medium 830. Other components, as well as the related functionality, of the control node are omitted in order not to obscure the concepts presented herein.

Figure 9:
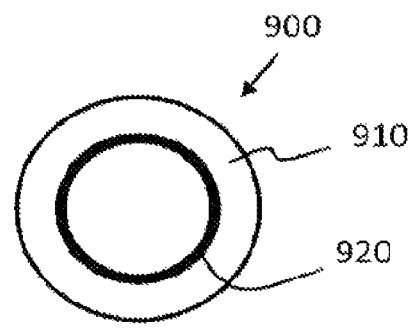
FIG. 9 shows an example computer program product.

FIG. 9 illustrates a computer readable medium 910 carrying a computer program comprising program code means 920 for performing, e.g., the methods illustrated in FIG. 7, when said program product is run on a computer. The computer readable medium and the code means may together form a computer program product 900.

Figure 10:
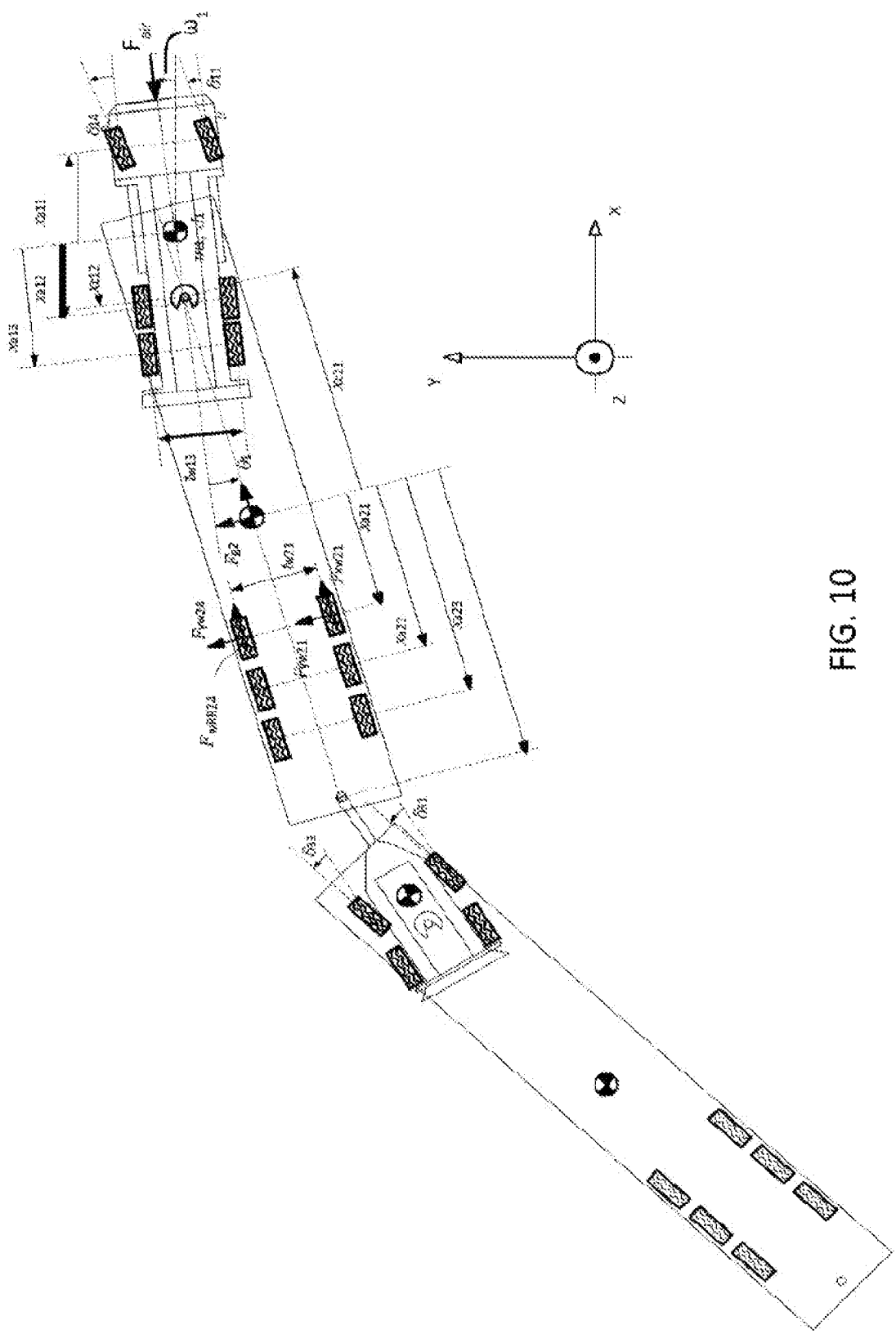
FIGS. 10-11 show aspects of a vehicle dynamics model.
Figure 11:
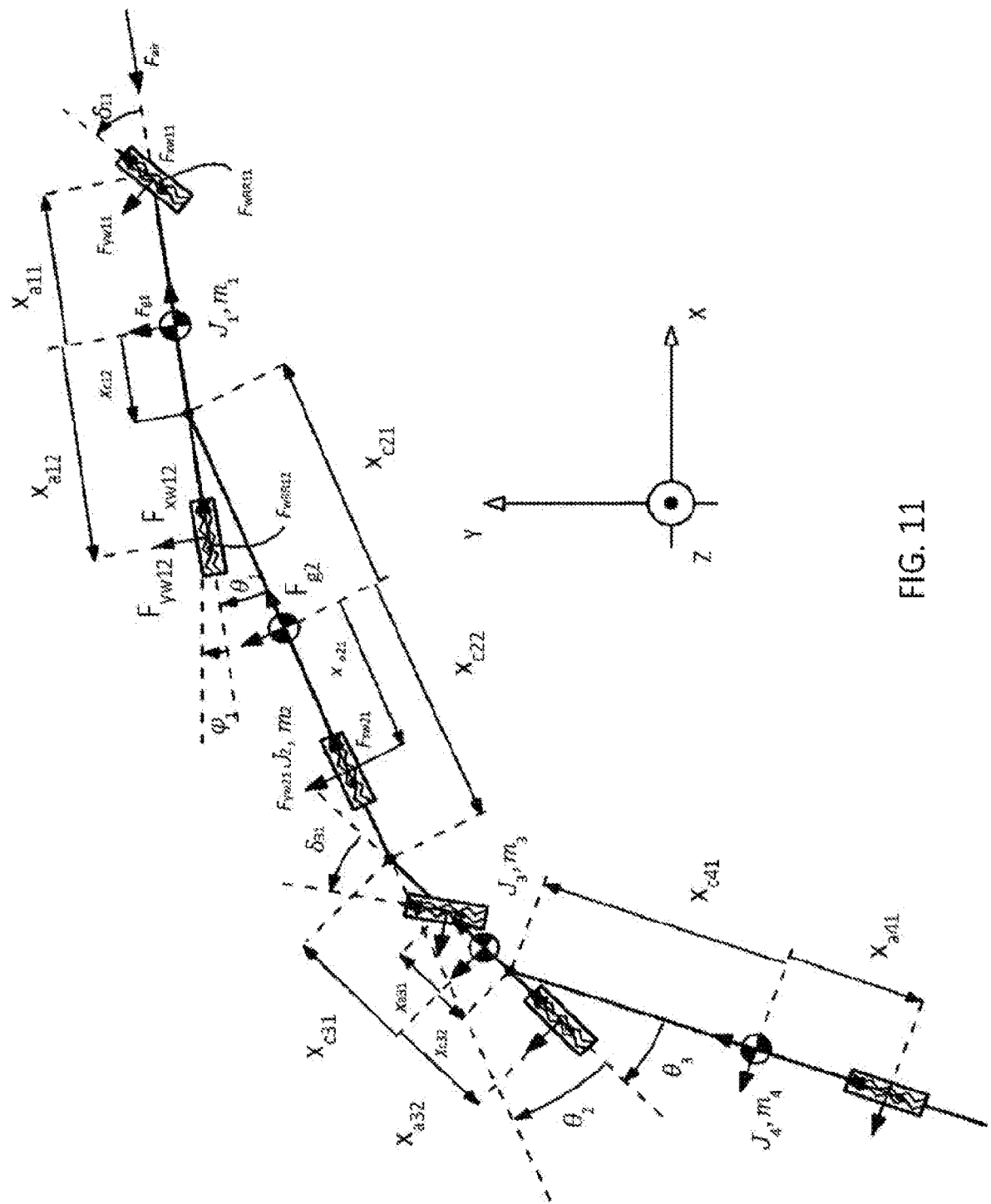

FIGS. 10 and 11 illustrates an example model of vehicle dynamics which can be used with the herein proposed methods. It was discussed above in connection with the reference to in "Computationally Efficient Nonlinear One- and Two-Track Models for Multitrailer Road Vehicles", by T. Ghandriz, B. Jacobson, P. Nilsson, L. Laine, and N. Fröjd, published in IEEE Access 9 Nov. 2020, ISSN: 2169-3536.

The invention claimed is:

1. A method for reducing off-tracking by a multi-trailer heavy duty vehicle during a maneuver, the method comprising obtaining a model of vehicle dynamics describing dynamics of the multi-trailer heavy duty vehicle, determining respective force trajectories for two or more axles of the vehicle as a solution to a non-linear optimal control problem, ("NOCP"), where the NOCP is formulated with an objective to at least minimize trailer off-tracking, wherein the NOCP is formulated based on the model of vehicle dynamics and a prediction of vehicle control during the maneuver, and controlling motion of the heavy duty vehicle during the maneuver based on the determined force trajectories.

2. The method according to claim 1, comprising obtaining information related to a road friction coefficient (μ) associated with an upcoming vehicle path, wherein the NOCP is formulated to account for the road friction coefficient (μ).

3. The method according to claim 2, further comprising configuring a limit $F_{max}$ on axle forces given by $$F_{max} = s\mu F_z$$

where S is a safety factor smaller than 1.0, and wherein the NOCP is constrained by the limit Fmax on axle forces.

4. The method according to claim 1, further comprising configuring lateral and longitudinal wheel slip limits ($\lambda_{lim}$) for at least two wheels of an axle on the heavy duty vehicle, wherein lateral and longitudinal wheel slip values are related to respective lateral and longitudinal tire force values ($F_x$, $F_y$) via a pre-determined combined tire slip model, wherein the NOCP is constrained by the lateral and longitudinal wheel slip limits ($\lambda_{lim}$).

5. The method according to claim 1, wherein the force trajectories comprise target tire force trajectories and/or target wheel slip trajectories for at least two axles to be followed during the maneuver.

6. The method according to claim 1, wherein the force trajectories comprise target wheel torque trajectories or target axle torque trajectories to be followed during the maneuver.

7. The method according to claim 1, wherein the heavy duty vehicle is a multi-trailer vehicle comprising a self-powered dolly vehicle unit.

8. The method according to claim 1, comprising solving the NOCP in real-time.

9. The method according to claim 1, comprising obtaining a solution to the NOCP from a pre-determined look-up table, ("LUT"), wherein the LUT comprises solutions to a plurality of NOCPs solved for different NOCP input parameters, where a solution is selected from the LUT in dependence of a respective set of parameters of a current operating scenario of the heavy duty vehicle and in dependence of the maneuver.

10. The method according to claim 9, comprising obtaining the solution to the NOCP by obtaining target brake and propulsion force trajectories from the LUT based on a steering angle of the vehicle and based on a speed of the vehicle.

11. The method according to claim 1, wherein a set of states of the NOCP comprise longitudinal speed of a first vehicle unit, lateral speed of the first vehicle unit, yaw angle of the first vehicle unit, as well as respective derivatives, and also articulation angles of the heavy duty vehicle and their derivatives.

12. The method according to claim 1, wherein the force trajectories for the two or more axles of the vehicle have equal tire forces for each side of the respective axle.

13. The method according to claim 2, wherein a distance of the path is between 5-300 m.

14. A control unit comprising processing circuitry configured to perform the method according to claim 1.

15. A heavy duty vehicle comprising the control unit according to claim 14.

16. A dolly vehicle unit comprising the control unit according to claim 14.

* * * * *